United States Patent
Shuck

(10) Patent No.: US 12,134,141 B2
(45) Date of Patent: Nov. 5, 2024

(54) MELT POOL MONITOR

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 35 days.

(21) Appl. No.: 17/343,300

(22) Filed: Jun. 9, 2021

(65) Prior Publication Data

US 2022/0395929 A1 Dec. 15, 2022

(51) Int. Cl.
| | |
|---|---|
| *B23K 26/342* | (2014.01) |
| *B22F 10/28* | (2021.01) |
| *B22F 10/36* | (2021.01) |
| *B22F 12/41* | (2021.01) |
| *B22F 12/90* | (2021.01) |
| *B23K 26/03* | (2006.01) |
| *B23K 26/06* | (2014.01) |
| *B23K 26/0622* | (2014.01) |

(Continued)

(52) U.S. Cl.
CPC .......... *B23K 26/342* (2015.10); *B22F 10/28* (2021.01); *B22F 10/36* (2021.01); *B22F 12/41* (2021.01); *B22F 12/90* (2021.01); *B23K 26/032* (2013.01); *B23K 26/034* (2013.01); *B23K 26/0622* (2015.10); *B23K 26/0626* (2013.01); *B23K 26/703* (2015.10); *B33Y 10/00* (2014.12); *B33Y 30/00* (2014.12); *B33Y 50/02* (2014.12)

(58) Field of Classification Search
CPC ............. B23K 26/342; B23K 26/0622; B23K 26/703; B23K 26/032; B23K 26/034; B23K 26/0626; B33Y 10/00; B33Y 30/00; B33Y 50/02; B22F 12/41; B22F 12/90; B22F 10/36; B22F 10/28
USPC ..................................... 219/76.11
See application file for complete search history.

(56) References Cited

U.S. PATENT DOCUMENTS

| | | | |
|---|---|---|---|
| 2008/0296270 A1* | 12/2008 | Song | B23K 26/032 |
| | | | 219/121.64 |
| 2008/0297909 A1 | 12/2008 | Comstock, II | |

(Continued)

OTHER PUBLICATIONS

Bourget et al., "Extinction controlled Adaptive Mask Coronagraph Lyot and Phase Mask dual concept for wide extinction area", 10 pgs., 2012 (Applicant points out, in accordance with MPEP 609.04(a), that the year of publication, 2012, is sufficiently earlier than the effective U.S. filing date, so that the particular month of publication is not in issue.).

(Continued)

*Primary Examiner* — Janie M Loeppke
*Assistant Examiner* — Simpson A Chen
(74) *Attorney, Agent, or Firm* — Shumaker & Sieffert, P.A.

(57) ABSTRACT

An additive manufacturing system may include an energy source, an optical system to modify and direct an energy beam from the energy source toward a component to form a melt pool, and a material delivery device to deliver material to the melt pool. The optical system may form an annular energy beam, direct the annular energy beam toward the component, receive at least a portion of thermal emissions produced by the annular energy beam and the melt pool, and direct the portion of the thermal emissions toward an imaging device, which may be used to control the energy source.

7 Claims, 3 Drawing Sheets

(51) Int. Cl.
  *B23K 26/70* (2014.01)
  *B33Y 10/00* (2015.01)
  *B33Y 30/00* (2015.01)
  *B33Y 50/02* (2015.01)

(56) References Cited

U.S. PATENT DOCUMENTS

2017/0145586 A1* 5/2017 Xiao ................... C30B 13/32
2021/0197286 A1* 7/2021 Sohn ................... G01J 5/004
2022/0226931 A1* 7/2022 Kotar ................ B23K 26/0869

OTHER PUBLICATIONS

Bourget et al., "A Coronagraph with a Variable-Diameter Occulting Disk", 4 pgs. Apr. 2001, 4 pgs.

* cited by examiner

MELT POOL MONITOR

TECHNICAL FIELD

The disclosure relates to additive manufacturing techniques.

BACKGROUND

Additive manufacturing generates three-dimensional structures through addition of material layer-by-layer or volume-by-volume to form the structure, rather than removing material from an existing component to generate the three-dimensional structure. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes to form the three-dimensional structures.

SUMMARY

In some examples, the disclosure describes an additive manufacturing system that may include an energy source, an optical system, and a material delivery device. The energy source may be configured to direct an energy beam toward a component. The optical system may be configured to form an annular energy beam from the energy beam, direct the annular energy beam toward a surface of the component to form a melt pool, receive at least a portion of thermal emissions produced by the annular energy beam and the melt pool at the surface of the component, and direct the portion of the thermal emissions toward an imaging device. The material delivery device may be configured to deliver material to the melt pool.

In some examples, the disclosure describes an additive manufacturing optical system that may include a collimator, a shaping unit, a lens, an optical device, and an imaging device. The collimator may be configured to collimate an energy beam from an energy source to form a collimated energy beam. The shaping unit may be configured to receive the collimated energy beam and form an annular energy beam. The lens may be configured to direct the annular energy beam toward a surface of a component to form a melt pool. The optical device may be configured to receive at least a portion of thermal emissions produced by the annular energy beam and the melt pool at the surface of the component. The optical device may be further configured to direct the portion of the thermal emissions toward the imaging device. The imaging device may be configured to detect, based on the portion of the thermal emissions, a change thermal emissions of the melt pool.

In some examples, the disclosure describes a technique that may include controlling, by a computing device, an energy source to deliver an energy beam to an optical system. The technique also may include forming, by the optical system, an annular energy beam from the energy beam. The technique also may include directing, by the optical system, the annular energy beam toward a surface of a component to form a melt pool. The technique also may include receiving, by the optical system, at least a portion of thermal emissions produced by the annular energy beam and the melt pool at the surface of the component. The technique also may include directing, by the optical system, the portion of the thermal emissions toward an imaging device, where the imaging device is operatively coupled to the computing device. The technique also may include determining, by the computing device, based on the portion of the thermal emissions, a change in the thermal emissions.

The details of one or more examples are set forth in the accompanying drawings and the description below. Other features, objects, and advantages will be apparent from the description and drawings, and from the claims.

DETAILED DESCRIPTION

Figure 1:
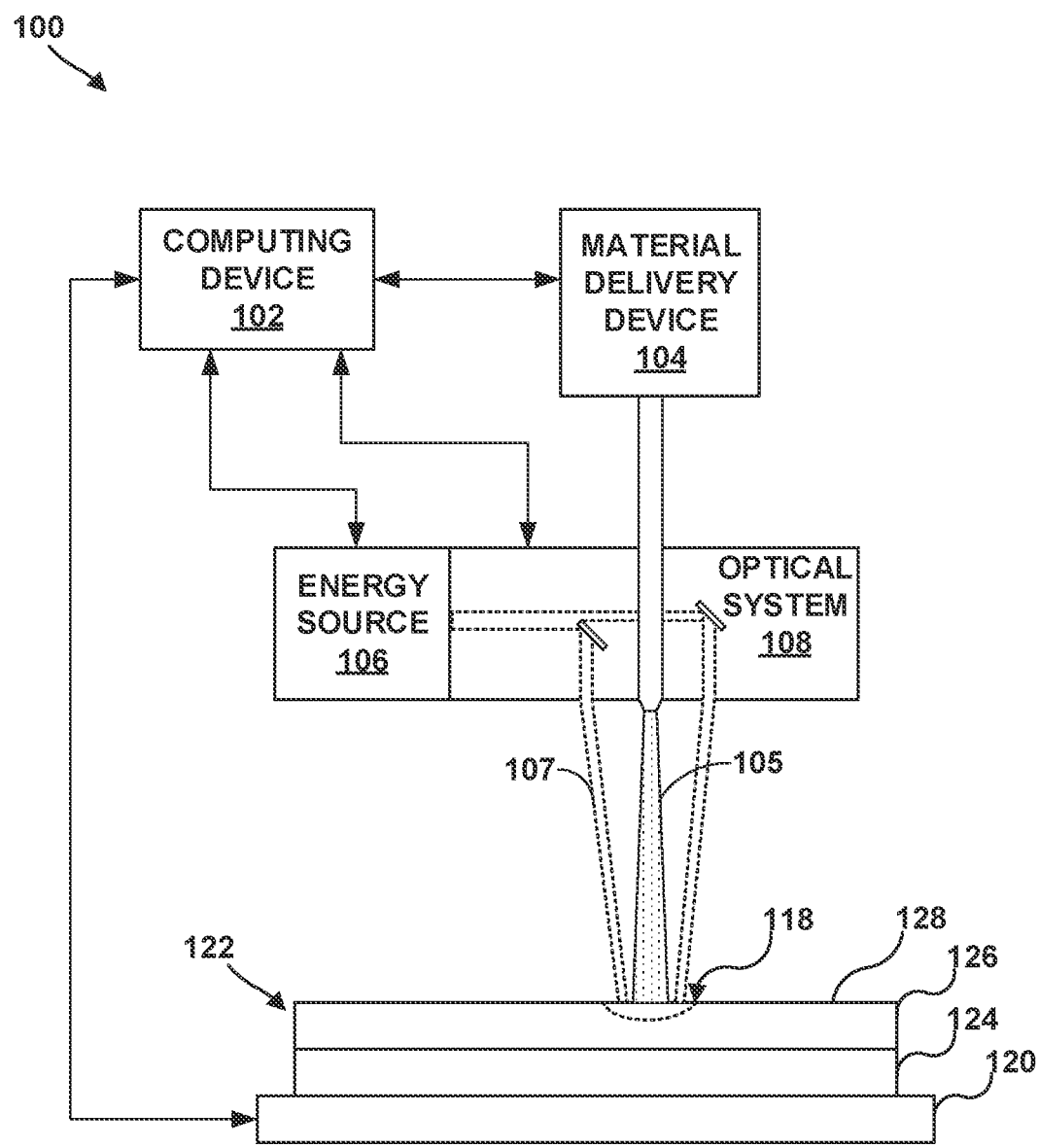
FIG. 1 is a conceptual block diagram illustrating an example additive manufacturing system that includes an optical system for producing an annular energy beam and sensing thermal emissions from the annular energy beam and a melt pool formed during the additive manufacturing technique.

The disclosure generally describes techniques and systems for controlling an energy beam during an additive manufacturing technique. Example systems may include an optical system that is configured to direct an annular energy beam toward a component to form a melt pool. The optical system may direct at least a portion of thermal emissions from the annular energy beam and the melt pool to an imaging device. The system may detect a change in thermal emissions using the imaging device and control the additive manufacturing process based on the change in thermal emissions. For example, the portion of the thermal emissions may include a conical or an annular shaped thermal emission intensity profile, which may enable detection of thermal emission changes at a plurality of locations around the annular profile. In comparison, a change in thermal emissions at or near a perimeter of a circular thermal emissions profile may be more difficult to detect. In this way, the systems and techniques described herein may enable detecting of changes in thermal emissions when the melt pool is at or near an edge of a component, in the cooling regions nearer an edge or outside of the melt pool where microstructure of the component develops, or both. This allows more accurate temperature and size control of the melt pool and more accurate temperature measurements of the cooling regions, which may improve of solidification microstructure and quality.

During additive manufacturing, a component is built up by adding material to a component in sequential layers. The final component is composed of a plurality of layers of material. In some additive manufacturing techniques for forming components from metals or alloys, an energy source may direct energy at a component to form a melt pool. A material delivery device may deliver a material to the melt pool, where at least some of the material at least partially melts and is joined to the component. The melt pool cools as energy is no longer delivered to that location of the component (e.g., due to the energy source scanning the energy over the surface of the component). The temperature and cooling rate of the melt pool and the surrounding areas of the component affect the microstructure of the component formed using the additive manufacturing technique. Some additive manufacturing systems may include thermal cameras configured to measure thermal emissions during the additive manufacturing technique to measure temperature of the component being formed.

In many cases, the energy output by the energy source is very high temperature and the intensity of its thermal emissions is significantly greater than the intensity of thermal emissions from the melt pool and surrounding area. Similarly, thermal emissions intensity at and near the center of the melt pool may be significantly greater than the intensity of thermal emissions near the edge of the melt pool and in areas surrounding the melt pool. Because of this, it may be difficult to accurately measure temperature and cooling rate of areas near the edge of the melt pool and in areas surrounding the melt pool. This results in difficulty predicting and controlling microstructure of the additively manufactured part.

Additionally, when a melt pool overlaps an edge of a component, the thermal emissions from the melt pool may decrease as a size of the melt pool is reduced by the edge overlap. The change in thermal emissions from the edge overlap melt pool may appear to indicate a reduction in the temperature of the melt pool. This may result in difficulty predicting and controlling microstructure of the component near the edge. Moreover, to counteract this temperature reduction, a system may increase an intensity of the energy beam of the energy source. This may result in an improper heating that may affect addition of the material to the component, the microstructure of the component, geometry of the component, or combinations thereof.

In accordance with techniques of this disclosure, an optical system may be configured to form and direct an annular energy beam toward a substrate to form a melt pool and direct thermal emissions from the annular beam and/or melt pool to a thermal imaging device. By generating the annular energy beam and detecting an annular thermal emissions profile, the systems and techniques described herein may be able to distinguish between a shrinking melt pool and melt back associated with melt pool overlap at a component edge, enable detecting of fainter emissions in the cooling regions nearer the edge of the melt pool and outside the melt pool, or both. This allows more accurate temperature control of the melt pool and more accurate temperature measurements of the cooling regions, which may improve of solidification microstructure and quality.

FIG. 1 is a conceptual block diagram illustrating an example system 100 for performing an additive manufacturing technique. System 100 includes an optical system 108 for both directing an annular energy beam 107 toward component 122 to form melt pool 118 and sensing thermal emissions produced by annular energy beam 107 and melt pool 118 at surface 128 of component 122 during the additive manufacturing technique. In the example illustrated in FIG. 1, system 100 includes a computing device 102, a material delivery device 104, an energy source 106, an optical system 108, and a stage 120. In other examples, system 100 may include additional components or fewer components. Computing device 102 is operably connected via one or more wired or wireless connections to material delivery device 104, energy source 106, optical system 108, and stage 120.

Stage 120 may be configured to selectively position and restrain component 122 in place relative to stage 120 during manufacturing of component 122. In some examples, stage 120 is movable relative to energy source 106 and/or energy source 106 is movable relative to stage 120. Similarly, stage 120 may be movable relative to material delivery device 104 and/or material delivery device 104 may be movable relative to stage 120. For example, stage 120 may be translatable and/or rotatable along at least one axis to position component 122 relative to energy source 106 and/or material delivery device 104. Similarly, energy source 106 and/or material delivery device 104 may be translatable and/or rotatable along at least one axis to position energy source 106 and/or material delivery device 104, respectively, relative to component 122.

Material delivery device 104 may be configured to deliver material 105 to selected locations of component 122 being formed. At least some of material 105 may impact melt pool 118 in component 122. Material 105 that impacts melt pool 118 may be joined to component 122. In some examples, material 105 may be supplied by material delivery device 104 in powder form. In other examples, material 105 may be supplied by material delivery device 104 in a non-powder form, e.g., a wire of solid material or the like.

In some examples, system 100 may be a blown powder additive manufacturing system. In some such systems, material delivery device 104 may deliver powder material 105 adjacent to surface 128 of component 122 by blowing the powder adjacent to surface 128, e.g., as a mixture of the powder with a gas carrier. In some examples, material delivery device 104 thus may be fluidically coupled to a powder source and a gas source, and material delivery device 104 may include one or more nozzles or other mechanisms for directing the powder to a particular location on surface 128. In some examples, material delivery device 104 may be mechanically coupled or attached to energy source 106 and/or optical system 108 to facilitate delivery of powder and energy for forming melt pool 118 at substantially the same location adjacent to component 122.

In other examples, system 100 may be a powder bed additive manufacturing system. In some such examples, material delivery device 104 may deliver powder material 105 adjacent to the surface of component 122 by spreading the powder on the surface of component 122, such that the powder rests on the surface prior to portions of the powder and/or component 122 being heated. In some examples of a powder bed additive manufacturing system, material delivery device 104 may include a device that spreads the powder or can otherwise manipulate the powder to move the powder within system 100.

In other examples, system 100 may be a wire additive manufacturing system. In some such examples, material delivery device 104 may deliver a wire of solid material 105 to the surface of component 122 by feeding the wire from a spool. In some examples of a wire additive manufacturing system, material delivery device 104 may include a device that feeds a terminal end of the wire into melt pool 118.

Energy source 106 may include a laser source, an electron beam source, plasma source, or another source of energy that may be absorbed by component 122 to form a melt pool and/or be absorbed by material 105. Example laser sources include a CO laser, a $CO_2$ laser, a Nd:YAG laser, or the like. In some examples, energy source 106 may be selected to provide energy with a predetermined wavelength or wavelength spectrum that may be absorbed by component 122 and/or material 105 during the additive manufacturing technique. Energy source 106 may direct an energy beam to optical system 108, which may modify the energy beam for delivery to surface 128 of component 122.

Optical system 108 is optically coupled to energy source 106 and configured to modify the energy beam to form annular energy beam 107. In some examples, optical system 108 may include one or more of a collimator, a shaping unit such as an axicon, a beam guide, a beam splitter, a reflector, or other optical devices configured to modify the energy beam to form annular energy beam 107 and aim, focus, or otherwise direct annular energy beam 107 toward predetermined positions at or adjacent to surface 128 of component 122.

In some examples, optical system 108 may include or define an energy delivery head. The energy delivery head may be movable in at least one dimension (e.g., translatable and/or rotatable) under control of computing device 102 to direct the energy toward a selected location at or adjacent to a surface of component 122. In some examples, a stream of material 105 delivered from material delivery device 104 to surface 128 may be coaxial with annular energy beam 107 and/or optics (e.g., energy delivery head) of optical system 108.

Computing device 102 is configured to control components of system 100 and may include, for example, a desktop computer, a laptop computer, a workstation, a server, a mainframe, a cloud computing system, or the like. Computing device 102 is configured to control operation of system 100, including, for example, material delivery device 104, energy source 106, optical system 108, and/or stage 120. Computing device 102 may be communicatively coupled to material delivery device 104, energy source 106, optical system 108, and/or stage 120 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 102 may be configured to control operation of material delivery device 104, energy source 106, optical system 108, and/or stage 120 to position component 122 relative to material delivery device 104, energy source 106, optical system 18, and/or stage 120. For example, as described above, computing device 102 may control stage 120 and material delivery device 104, energy source 106, and/or one or more components of optical system 108 to translate and/or rotate along at least one axis to position component 122 relative to material delivery device 104, energy source 106, and/or optical system 108. Positioning component 122 relative to material delivery device 104, energy source 106, and/or optical system 108 may include positioning a predetermined surface (e.g., a surface to which material is to be added) of component 122 in a predetermined orientation relative to material delivery device 104, energy source 106, and/or optical system 108.

Computing device 102 may be configured to control system 100 to deposit layers 124 and 126 to form component 122. As illustrated in FIG. 1, component 122 may include a first layer 124 and a second layer 126, although many components may be formed of additional layers, such as tens, hundreds, thousands, or the like. Component 122 is simplified in geometry and the number of layers compared to many components formed using additive manufacturing techniques. Although techniques are described herein with respect to component 122 including first layer 124 and second layer 126, the technique may be extended to components with more complex geometry and any number of layers.

To form component 122, computing device 102 may control material delivery device 104 and energy source 106 to form, on a surface 128 of first layer 124, a second layer 126 using an additive manufacturing technique. Computing device 102 may control energy source 106 to deliver energy beam 107 to a volume of material at or near surface 128 to form melt pool 118. For example, computing device 102 may control the relative position of energy source 106 and stage 120 to direct energy beam 107 to form melt pool 118. Computing device 102 also may control material delivery device 104 to deliver material 105 to melt pool 118. For example, computing device 102 may control the relative position of material delivery device 104 and stage 120 to direct powder at or on to melt pool 118.

In addition to forming and directing annular energy beam 107, optical system 108 may include an imaging device and an associated optical train, which senses thermal emissions at or near component 122 during the additive manufacturing technique. For example, optical system 108 may include a visible light imaging device, an infrared imaging device, or an imaging device that is configured (e.g., using a filter) to image a specific wavelength or wavelength range. Alternatively, optical system 108 may include a first optical system to form and direct annular energy beam 107, and a second, different optical system to sense thermal emissions at or near component 122 during the additive manufacturing technique.

At least a portion of the thermal emissions may include an annular shaped thermal emissions intensity profile. By sensing the annular thermal emissions intensity profile, system 100, e.g., computing device 102, may determine a change in thermal emissions at one or more circumferential portions (e.g., sections or wedges) of the annular thermal emissions intensity profile. In this way, system 100 may be configured to detect a change in thermal emissions at or near an edge of melt pool 118. For example, when melt pool 118 overlaps at least a portion of an edge of component 122, the annular thermal emissions intensity profile may indicate a change in thermal emissions corresponding to the portion of the annular profile positioned beyond the edge of component 122. This change in thermal emissions may be indicative of melt back associated with melt pool 118 positioned over at least a portion of the edge of component 122. In some examples, computing device 102 may be configured to, based on the change in the thermal emissions, control an intensity of energy beam 107. For example, system 100, e.g., computing device 102, may maintain an intensity of energy beam 107 even though a total thermal emissions sensed at melt pool 118 has decreased. In this way, system 100, e.g., computing device 102, may maintain a selected melt pool temperature to control a microstructure and quality of the deposited material.

In some examples, the optical train may include one or more reflective, refractive, diffractive optical components configured to direct thermal emissions to the imaging device. For example, the optical train may be configured to direct thermal emissions from near component 122 and/or melt pool 118 formed in component 122 to the imaging device. In some examples, at least a portion of the optical train is coaxial with the axis of annular energy beam 107, and the at least a portion of the optical train may be attached to or otherwise configured to move with the portion of optical system 108 that directs or focuses annular energy beam 107 at or near the surface of component 122. In this way, optical system 108 may track melt pool 118 as it moves across component 122, without needing to correct for any offsets between portions of optical system 108 directing annular energy beam 107 and portions of optical system 108 sensing thermal emissions and/or needing to correct for geometry of component 122. In other examples, the optical train may not be coaxial with the axis at which energy source 106 outputs energy, and computing device 102 may be configured to compensate for the offset and any affects this may have on the imaging, including shadowing, interference, geometry of component 122, or the like.

In some examples, optical system 108 may include an occulting device. The occulting device may be configured to reduce or block thermal emissions produced by a portion of annular energy beam 107 or a portion of melt pool 118, such as, for example, a portion of thermal emissions at or near a center of melt pool 118 that may otherwise obfuscate emissions from cooling regions of material at or near the edge of melt pool 118 and outside of melt pool 118. The occulting device may be a rigid occulting device or a dynamic occulting device.

Figure 2:
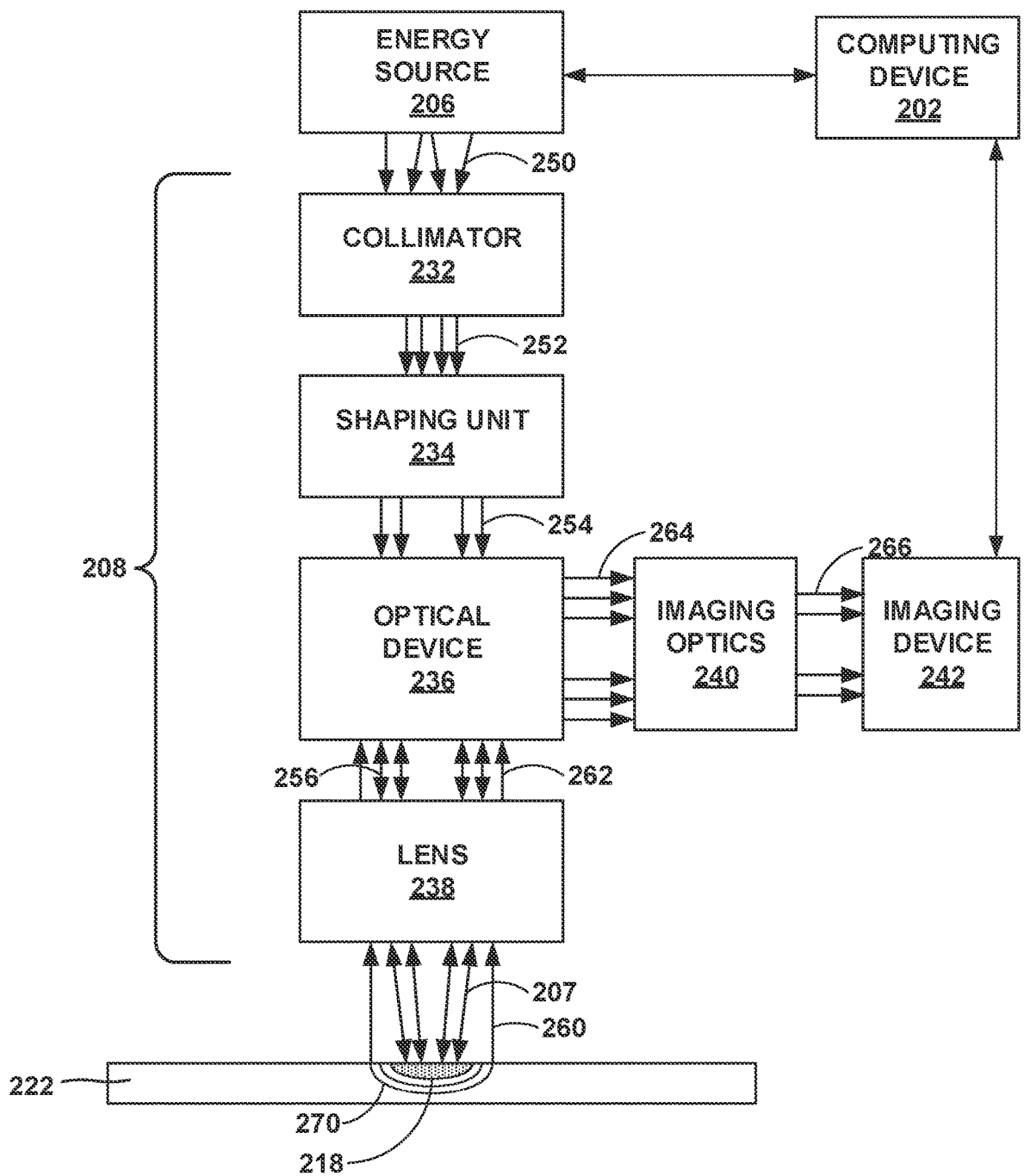
FIG. 2 is a conceptual block diagram illustrating an example optical system for sensing thermal emissions from the annular energy beam and a melt pool formed during the additive manufacturing technique.

FIG. 2 is a conceptual block diagram illustrating an example optical system 208 for observing thermal emissions at and/or around a melt pool formed during an additive manufacturing technique. Optical system 208 is an example of optical system 108 describe above in reference to FIG. 1. For example, optical system 208 may modify energy beam 250 from energy source 206 to direct annular energy beam 207 toward component 222 to form melt pool 118. Additionally, optical system 108 may be operatively coupled to energy source 206 and computing device 202, which may be the same as or substantially similar to energy source 106 and computing device 102, respectively, as described above in reference to FIG. 1.

In the examples illustrated in FIG. 2, optical system 208 includes an optical train that includes collimator 232, shaping unit 234, optical device 236, lens 238, imaging optics 240, and imaging device 242. In other examples, optical system 208 may include additional components or fewer components. Imaging device 242 may include any suitable imaging device, including, for example, a visible light imaging device, an infrared imaging device, an imaging device that is configured (e.g., using a filter) to image a specific wavelength or wavelength range, a two color pyrometry imaging device, or the like.

Collimator 232 may include one or more optical devices to narrow energy beam 250 by aligning particles or waves of beam 250, limiting a spatial cross-section of energy beam 250, or both. For example, collimator may include one or more curve reflectors or lens having a substantially infinite focal point. Collimator 232 may output collimated energy beam 252. In some examples, optical system 208 may not include a collimator, other components of optical system 208 (e.g., shaping unit 234) may collimate energy beam 250, or collimator 232 may be a component of energy source 206.

Shaping unit 234 is configured to receive and modify collimated energy beam 252 to produce annular energy beam 254. For example, shaping unit 234 may include one or more axicon lenses and one or more convex lenses arranged to produce annular energy beam 254. In some examples, annular energy beam 254 may traverse optical device 236 (e.g., outputting annular energy beam 256) and lens 238 may focus annular energy beam 207 toward melt pool 218. In some examples, optical system 208 may not include lens 238, and shaping unit 234 may focus annular energy beam 207 toward melt pool 218.

When annular energy beam 207 forms melt pool 218, annular energy beam 207 and melt pool 218 may produce thermal emissions 260. For example, cooling zone 270 may surround melt pool 218. Cooling zone 270 may include temperature gradients from the temperature of melt pool 218 to ambient temperature. Melt pool 218 and cooling zone 270 may emit thermal emissions 260 (e.g., thermal radiation), which travels through optical system 208 (e.g., lens 238, optical device 236, and imaging optics 240) to imaging device 242.

For example, thermal emissions 260 may traverse lens 238. Lens 238 may output thermal emissions 262. Optical device 236 may receive thermal emissions 262. Optical device 236 may include one or more optical devices used to output thermal emissions 264 to imaging device 242. In some examples, optical system 208 may include optional imaging optics 240. Optical device 236 and imaging optics 240 may include one or more refractive optical device (e.g., a lens), one or more reflective optical device (e.g., a mirror), one or more diffractive optical devices (e.g., a grating), one or more dichroic optical devices (e.g., a dichroic filter or mirror), or the like. In some examples, optical device 236 and/or imaging optics 240 may include an occulting device. Although one set of imaging optics 240 is illustrated in FIG. 2, in other examples, optical system 208 may not include imaging optics or may include two or more sets of imaging optics.

Thermal emissions 266 output from imaging optics 240 may be incident on imaging device 242. Imaging device 242 may be the same as or substantially similar to imaging device may include a visible light imaging device, an infrared imaging device, or an imaging device that is configured (e.g., using a filter) to image a specific wavelength or wavelength range. Imaging device 242 may be configured to detect a change in thermal emission 266 during an additive manufacturing technique. For example, imaging device 242 may be operatively coupled to computing device 202. Computing device may determine, based on at least portion of thermal emissions 266 received by imaging device 242, the change in thermal emissions. In some examples, the change in thermal emissions 266 may include a change in thermal emissions along a portion of an annular shaped thermal emissions intensity profile of thermal emissions 266. For example, the change in thermal emissions may be indicative of melt back associated with melt pool 118 being positioned over at least a portion of an edge of component 122. Computing device 202 may be configured to, based on the change in the thermal emissions 226, control energy source 206 to control an intensity of energy beam 250.

As illustrated in FIG. 2, in some examples, at least a portion of optical system 208 is coaxial with the axis at which energy source 206 outputs energy beam 250. For example, at least a portion of optical device 236 may be coaxial with the axis at which energy source 206 outputs energy beam 250. As discussed above, coaxial alignment of optics used to produce annular energy beam 207 and optics used to detect thermal emissions 260 may reduce image manipulation that otherwise may be applied to the resulting image to correct for geometry of component 222, angular offset of optical system 208 relative to energy source 206, shadowing due to the angular offset, interference, or the like.

Figure 3:
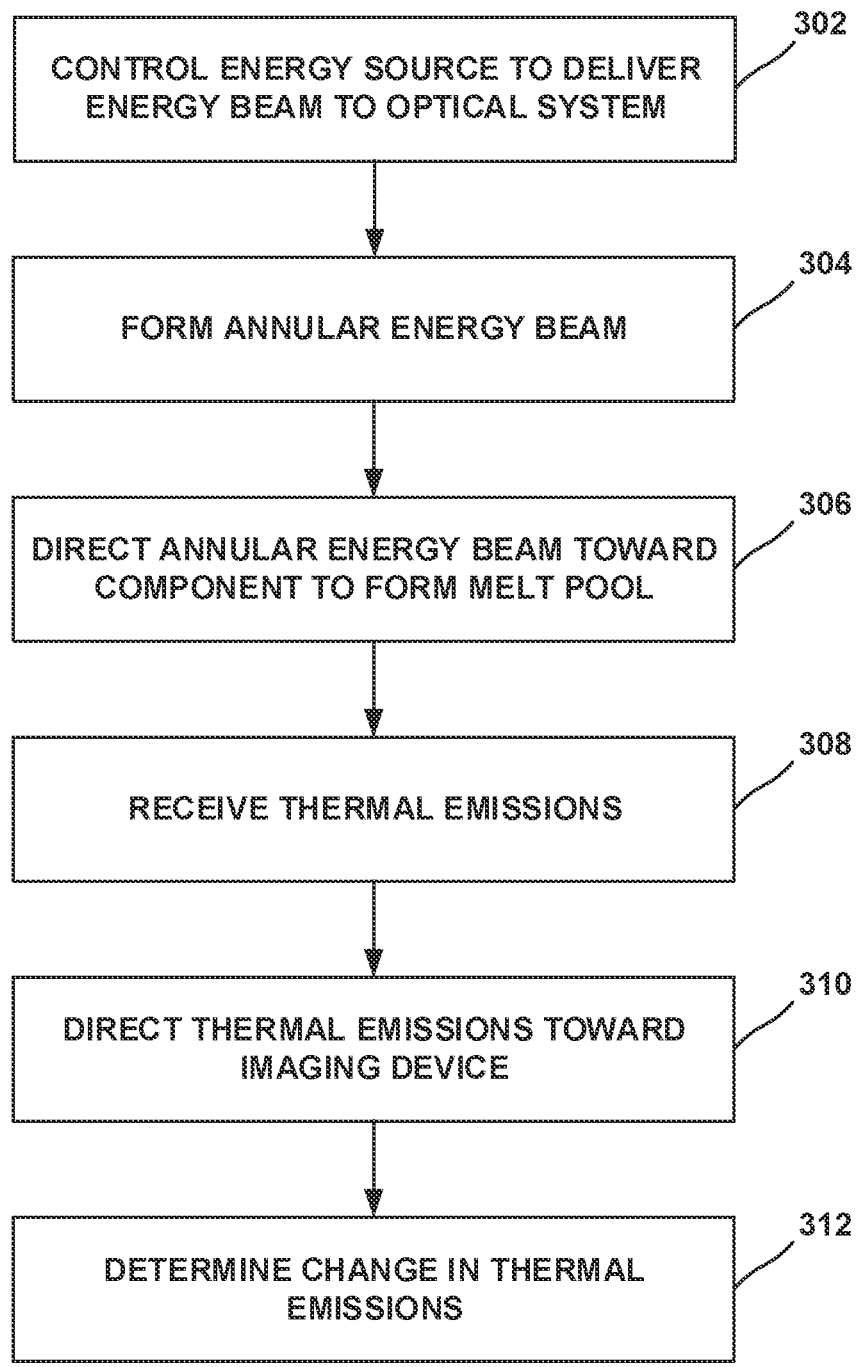
FIG. 3 is a flow diagram illustrating an example technique for controlling an additive manufacturing technique.

FIG. 3 is a flow diagram illustrating an example technique for controlling an additive manufacturing technique. The technique of FIG. 3 will be described with reference to FIGS. 1 and 2. A person having ordinary skill in the art will appreciate that the technique of FIG. 3 may be implemented using other systems.

The technique illustrated in FIG. 3 includes controlling, by computing device 102, an energy source to deliver energy beam 250 to optical system 208 (302). The technique also includes forming, by optical system 208, e.g., shaping unit 234, annular energy beam 254 from energy beam 250 (304). The technique also includes directing, by optical system 208, e.g., optical device 236 and/or lens 238, annular energy beam 207 toward a surface of component 222 to form a melt pool 218 (306).

The technique also includes receiving, by optical system 208, e.g., optical device 236, at least a portion of thermal emissions 260 produced by annular energy beam 207 and melt pool 218 at the surface of component 222 (308). The portion of thermal emissions 260 may include an annular shaped thermal emissions intensity profile. The technique also includes directing, by optical system 208, e.g., optical device 236 and/or imaging optics 240, the portion of thermal emissions 260 toward imaging device 242 (310). In some examples, the technique may include occulting a portion of thermal emissions 260.

The technique also includes determining, by computing device 202, based on the portion of thermal emissions 260, a change in the thermal emissions (312). In some examples, determining the change in the thermal emissions may include determining, by computing device 202, a change in an intensity of a portion of an annular shaped thermal emissions intensity profile. As discussed above, in some examples, the change in thermal emissions is indicative of melt back associated with the melt pool positioned over at least a portion of an edge of the component.

In some examples, the technique may include controlling, by computing device 202, e.g., via energy source 206, based on the change in thermal emissions 260, an intensity of energy beam 250 to maintain a selected temperature or size of melt pool 218.

In some examples, computing device 102 may control material delivery device 104 to deliver a powder at or near melt pool 118. At least some of the powder may impact melt pool 118 and join to component 122.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. An additive manufacturing system comprising:
an energy source configured to direct an energy beam toward a component;
an optical system configured to:
form an annular energy beam from the energy beam;
direct the annular energy beam toward a surface of the component to form a melt pool;
receive at least a portion of thermal emissions produced by the annular energy beam and the melt pool at the surface of the component as an annular shaped thermal emissions intensity profile; and
direct the portion of the thermal emissions toward an imaging device;
and a material delivery device configured to deliver material to the melt pool; and
a computing device coupled to the imaging device, wherein the computing device is configured to:
receive, from the imaging device, an indication of the annular shaped thermal emissions intensity profile comprising thermal emissions observed at a plurality of locations at different circumferential portions of the annular shaped thermal emissions intensity profile;
determine, based on the annular shaped thermal emissions intensity profile received by the imaging device, a change at one or more circumferential portions of the annular shaped thermal emissions intensity profile,
compare the observed thermal emissions at the plurality of locations to determine whether the change at one or more circumferential portions of the annular shaped thermal emissions intensity profile to determine whether the change is due to a shrinking meltpool or whether the change is due to melt back associated with melt pool overlap at a component edge; and
responsive to determining the change at one or more circumferential portions is indicative of melt back associated with the melt pool positioned over at least a portion of the component edge, maintaining an intensity of the annular energy beam.

2. The additive manufacturing system of claim 1, wherein the computing device is configured to control the intensity of the energy beam to maintain a selected melt pool temperature.

3. The additive manufacturing system of claim 1, wherein the optical system is coaxial with a material stream of the material delivery device.

4. The additive manufacturing system of claim 1, wherein the melt pool is at least partially surrounded by a cooling region, and wherein the optical device is configured to transmit to the imaging device at least some thermal emissions produced by the cooling region.

5. An additive manufacturing optical system comprising:
a collimator configured to collimate an energy beam from an energy source to form a collimated energy beam;
a shaping unit configured to receive the collimated energy beam and form an annular energy beam;
a lens configured to direct the annular energy beam toward a surface of a component to form a melt pool;
an optical device configured to:
receive at least a portion of thermal emissions produced by the annular energy beam and the melt pool at the surface of the component as an annular shaped thermal emissions intensity profile comprising thermal emissions at a plurality of locations at different circumferential portions of the annular shaped thermal emissions intensity profile; and
direct the portion of the thermal emissions toward the imaging device;
an imaging device configured to detect, based on the annular shaped thermal emissions intensity profile, a change at one or more circumferential portions of the annular shaped thermal emissions intensity profile; and
a computing device coupled to the imaging device, wherein the computing device is configured to:
compare the thermal emissions at the plurality of locations to determine whether the change at one or more circumferential portions of the annular shaped thermal emissions intensity profile to determine whether the change is due to a shrinking melt pool or whether the change is due to melt back associated with melt pool overlap at a component edge; and
responsive to determining the change at one or more circumferential portions is indicative of melt back associated with the melt pool positioned over at least a portion of the component edge, maintaining an intensity of the annular energy beam.

6. The additive manufacturing optical system of claim 5, wherein the melt pool is at least partially surrounded by a cooling region, and wherein the optical device is configured to transmit to the imaging device at least some thermal emissions produced by the cooling region.

7. A method comprising:
controlling, by a computing device,
an energy source to deliver an energy beam to an optical system;
forming, by the optical system, an annular energy beam from the energy beam;
directing, by the optical system, the annular energy beam toward a surface of a component to form a melt pool;
receiving, by the optical system, at least a portion of thermal emissions produced by the annular energy beam and the melt pool at the surface of the component as an annular shaped thermal emissions intensity profile comprising thermal emissions observed at a plurality of locations at different circumferential portions of the annular shaped thermal emissions intensity profile;
directing, by the optical system, the portion of the annular shaped thermal emissions intensity profile toward an imaging device,
wherein the imaging device is operatively coupled to the computing device;
determining, by the computing device, based on the annular shaped thermal emissions intensity profile, a change at one or more circumferential portions of the annular shaped thermal emissions intensity profile;
comparing by the computing device, the observed thermal emissions at the plurality of locations to determine whether the change at one or more circumferential portions of the annular shaped thermal emissions intensity profile to determine whether the change is due to a shrinking melt pool or whether the change is due to melt back associated with melt pool overlap at a component edge; and
responsive to determining the change at one or more circumferential portions is indicative of melt back associated with the melt pool positioned over at least a portion of the component edge, maintaining an intensity of the annular energy beam.

* * * * *